(12) United States Patent
Stockx

(10) Patent No.: US 6,501,723 B2
(45) Date of Patent: Dec. 31, 2002

(54) DEVICE SUITABLE FOR MANUFACTURING AN OPTICAL REGISTRATION CARRIER, SUCH AS A MASTER PLATE

(75) Inventor: Henricus T. L. P. Stockx, Someren-Eind (NL)

(73) Assignee: OTB Group B.V., Eindoven (NL)

( * ) Notice: Subject to any disclaimer, the term of this patent is extended or adjusted under 35 U.S.C. 154(b) by 0 days.

(21) Appl. No.: 10/112,940

(22) Filed: Apr. 2, 2002

(65) Prior Publication Data

US 2002/0105894 A1 Aug. 8, 2002

Related U.S. Application Data

(63) Continuation of application No. 09/656,825, filed on Sep. 7, 2000.

(30) Foreign Application Priority Data

Sep. 8, 1999 (NL) .............................................. 1013003

(51) Int. Cl.[7] .................................................. G11B 7/00
(52) U.S. Cl. ............................ 369/112.24; 369/124.01; 369/44.14; 369/49.33
(58) Field of Search ........................... 369/44.11, 44.12, 369/44.14, 44.23, 44.28, 44.37, 112.01, 112.08, 112.13, 112.2, 112.21, 112.26, 93, 94

(56) References Cited

U.S. PATENT DOCUMENTS

| 5,793,734 A | 8/1998 | Tsuchiya |
| 6,094,410 A | 7/2000 | Fan |
| 6,392,977 B2 * | 5/2002 | Ando et al. ............ 369/112.01 |

* cited by examiner

*Primary Examiner*—Muhammad Edun
(74) *Attorney, Agent, or Firm*—Pillsbury Winthrop LLP

(57) ABSTRACT

A device suitable for manufacturing an optical registration carrier, such as a master plate, which device comprises a support for said optical registration carrier, at least a first and a second light source, wherein the wavelengths of the light from said first and said second light source are different from each other, as well as an objective disposed between said light sources and said support, which is movable with respect to said light sources. A correction lens is disposed between the first light source and the objective, which correction lens can be moved jointly with the objective. The focal points of the two light sources at least substantially coincide with various movements of the objective and the correction lens with respect to the light source.

14 Claims, 5 Drawing Sheets

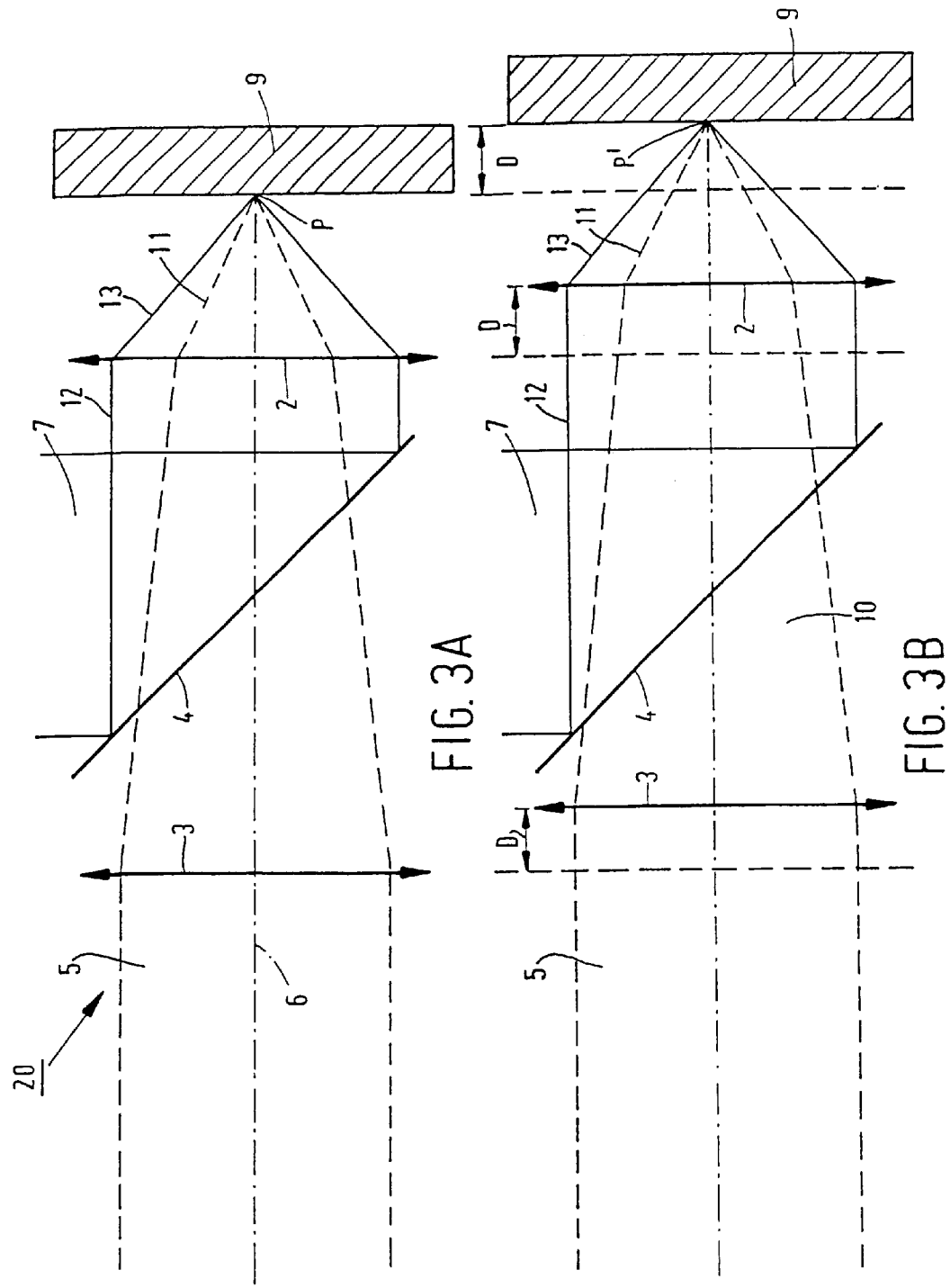

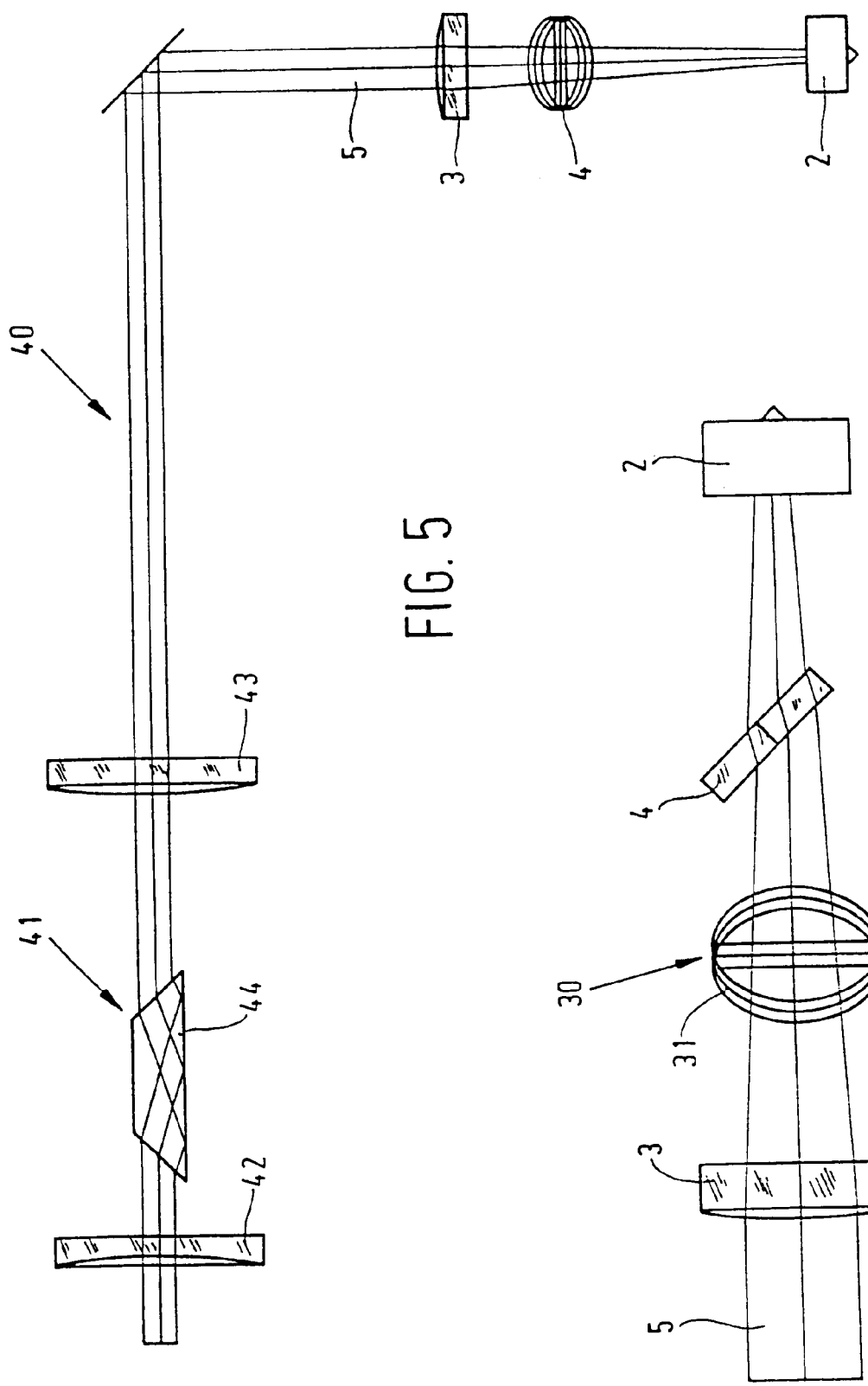

DEVICE SUITABLE FOR MANUFACTURING AN OPTICAL REGISTRATION CARRIER, SUCH AS A MASTER PLATE This is a Continuation of National Application Ser. No. 09/656,825 filed Sep. 7, 2000.

The invention relates to a device suitable for manufacturing an optical registration carrier, such as a master plate, which device comprises a support for said optical registration carrier, at least a first and a second light source, wherein the wavelengths of the light from said first and said second light source are different from each other, as well as an objective disposed between said light sources and said support, which is movable with respect to said light sources.

The term master plate is understood to mean a plate which can be used for making a mould that is used for manufacturing CD's, DVD's and the like by means of an injection moulding process. It is also possible, however, to use the master plate itself as a mould. The term optical registration carrier as used in the present patent application refers to a master plate as well as to a CD or DVD or the like, unless indicated otherwise.

In a device referred to in the introduction, which is known per se, a light source having a relatively small wavelength is used for writing the optical registration carrier to be manufactured. Said light source will hereinafter be called the writing light source. Another light source having a greater wavelength is used for focussing the writing light source. This light source will hereinafter be called the focussing light source.

The advantage of this arrangement is that it makes it possible to select the optimum wavelength of the light source for the required writing or focussing function. In addition, when writing on an optical registration carrier including a photosensitive lacquer it is possible to select a wavelength for the focussing light source to which said photosensitive lacquer is insensitive.

The two light sources direct their beams at the optical registration carrier to be worked via the same objective, to which end the focal points of the two light sources need to coincide. During focussing, the objective is moved with respect to the light sources and with respect to the support of the optical registration carrier until the focussing light source is accurately focussed on the optical registration carrier. Since the two light sources have different wavelengths, also the focal distances of the objective are different for these different wavelengths. When the objective is moved with respect to the focussing light source, also its position with respect to the writing light source changes. The consequence of this is that when the differences between the wavelengths of the light sources are relatively large, the writing light source cannot be kept focussed when the objective is being moved for focussing the focussing light source.

The object of the invention is to provide a device wherein light sources having different wavelengths can be focussed simultaneously in a simple manner.

This objective is accomplished with the device according to the invention in that a correction lens is disposed between the first light source and the objective, which correction lens can be moved jointly with the objective, wherein the focal points of the two light sources will at least substantially coincide with various movements of the objective and the correction lens with respect to the light source.

By means of the correction lens the light beam from the first light source is caused to converge or diverge relative to the light beam from the second light source in such a manner that the two light beams are focussed at the same point after exiting the objective. By moving the objective jointly with the correction lens, the focal points of the two light sources will coincide in every position of the objective with respect to the light source.

Preferably the two light sources are lasers, with the first light source being a focussing laser and the second light source being a writing laser. The wavelength of the focussing laser is preferably greater than that of the writing laser. The first light source must converge between the correction lens and the objective thereby.

The invention will now be explained in more detail with reference to the drawings, in which:

FIGS. 3A and 3B show the focussing operation as carried out by means of the device which is shown in FIG. 2; and FIGS. 4, 5 and 6 show different embodiments of the device of FIG. 2.

Parts corresponding to each other are indicated by the same numerals in the figures.

Figure 1:
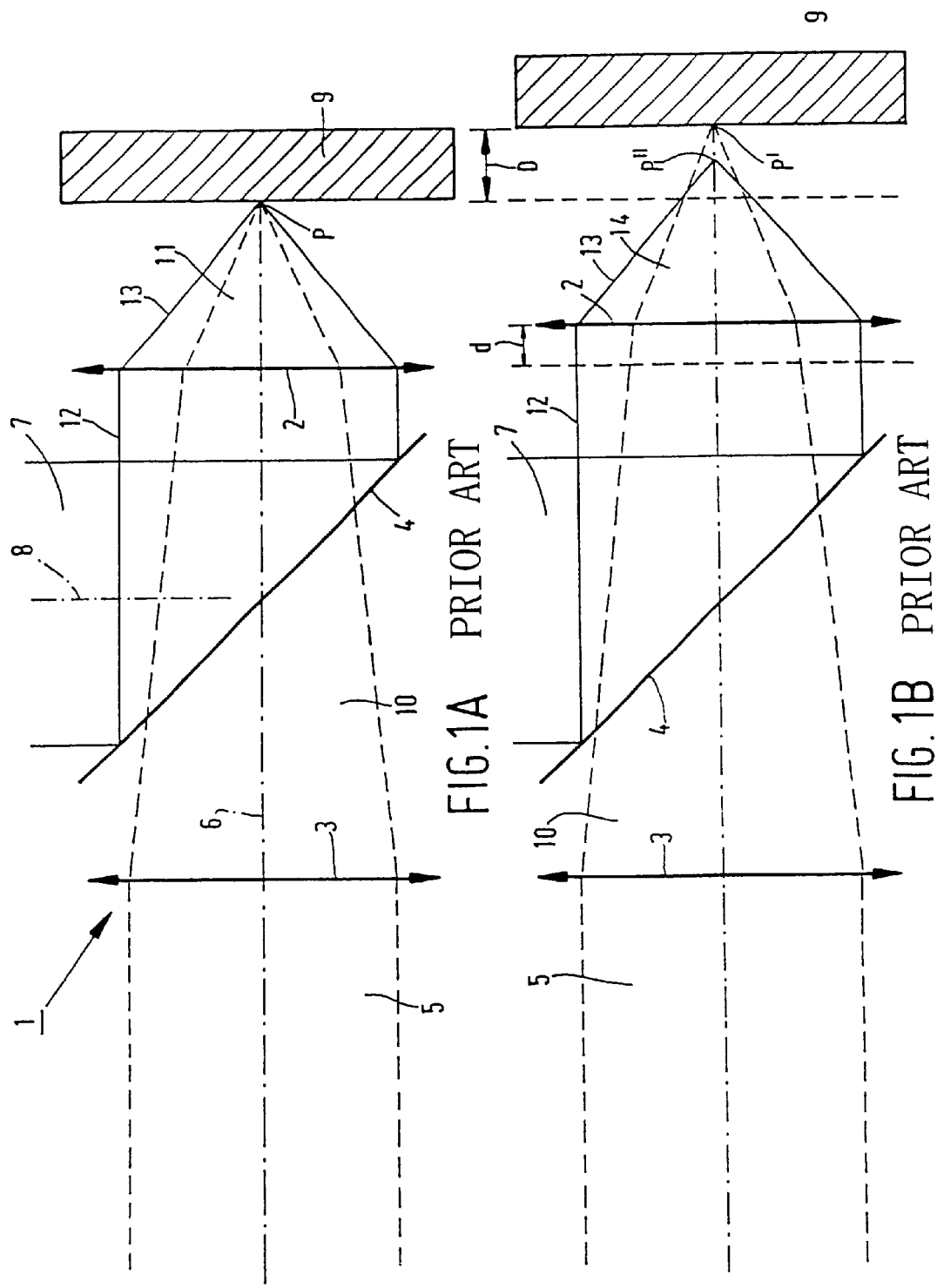
FIGS. 1A and 1B show the focussing operation as carried out in accordance with the prior art.

FIGS. 1A and 1B show a device 1 according to the prior art, comprising first and second light sources (not shown), an objective 2, a lens 3 disposed parallel to said objective, and a plan-parallel plate 4 disposed at an angle of 45° between lens 3 and objective 2. A first light source (not shown) is disposed on a side of lens 3 that faces away from objective 2, from where a first, substantially parallel light beam 5 is emitted in the direction of objective 2 along an optical axis 6. Device 1 furthermore comprises a second light source (not shown), from where a second substantially parallel light beam 7 is emitted in the direction of plan-parallel plate 4 along an optical axis 8 extending transversely to optical axis 6. Plan-parallel plate 4 is reflective to second light beam 7, as a result of which second light beam 7 is deflected by plan-parallel plate 4 in a direction parallel to optical axis 6. Plan-parallel plate 4 is transparent to first light beam 5. The second light beam 7 is used for writing an optical registration carrier 9, such as a master plate, for example, which extends parallel to objective 2. In order to work the optical registration carrier 9 accurately, it is necessary for the second light beam 7 to be focussed on the optical registration carrier 9. Said focussing is carried out with the aid of the first light beam 5. First light beam 5 has a greater wavelength than second light beam 7. In order to be able to focus light beam 5 in the same focal point as second light beam 7, light beam 5 is converged into a light beam 10 by means of lens 3. The light 10 that falls on the objective focusses itself with light beam 11 in focal point P. The second light beam 7 is deflected into light beam 12 by plan-parallel plate 4 and focussed in point P as light beam 13 by objective 2.

If the distance between the light sources and the optical registration carrier 9 increases by a distance D (see FIG. 1B), for example due to a slight change of the position of a support of the optical registration carrier or due to differences in thickness of optical registration carrier 9, objective 2 will be moved with respect to the first light source by means of a focussing device that is known per se, over such a distance d that the converging light beam 10 will be focussed as light beam 14 in point P' on the optical registration carrier 9 by objective 2. The parallel light beam 12 from the second light source is focussed by objective 2 in point P'', which is spaced from objective 2 by the same distance as point P in the situation as shown in FIG. 1A. As can be gathered clearly from FIG. 1B, focal points P' and P'' do not coincide, and it is not possible to work the optical registration carrier 9 correctly by means of the light beam from the second light source.

Figure 2:
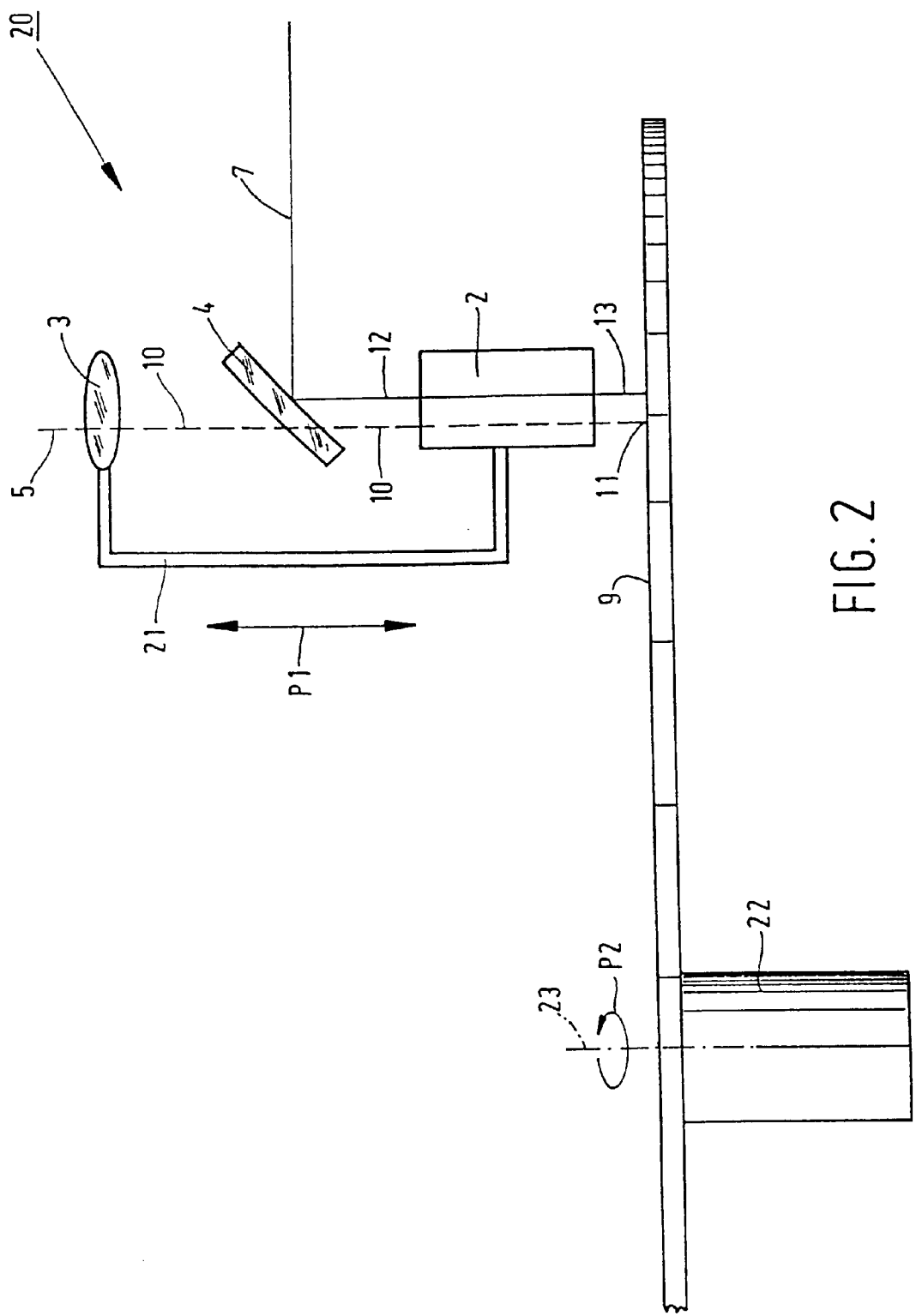
FIG. 2 shows a device according to the invention.

FIG. 2 shows a device 20 according to the invention, which is different from the device 1 that is shown in FIGS.

1A and 1B in that lens 3 and objective 2 are rigidly interconnected by means of a bracket 21. The objective and the correction lens 3 can be jointly moved by means of bracket 21 in directions indicated by double arrow P1.

The device 20 that is shown in FIG. 2 furthermore includes a support 22 for the optical registration carrier 9 that is to be worked. Support 22 is rotatable about an axis 23 that extends parallel to optical axis 6, in a direction indicated by arrow P2 and in a direction opposite thereto.

The operation of the device 20 that is shown in FIG. 2 will now be explained with reference to FIGS. 3A and 3B.

The situation that is shown in FIG. 3A is similar to the situation that is shown in FIG. 1A, wherein the two light beams 5, 7 are focussed in point P via objective 2.

In the situation that is shown in FIG. 3B the optical registration carrier has been moved a distance D. light beam 5 is focussed on the moved optical registration carrier 9 in point P' by means of a focussing device that is known per se, which focussing device is disposed in device 20, by moving both lens 3 and objective 2 a distance D as well. Since the objective 2 has been moved the same distance D as the optical registration carrier 9, the parallel light beam 12 from the second light source will likewise be focussed in point P'.

Figure 6:
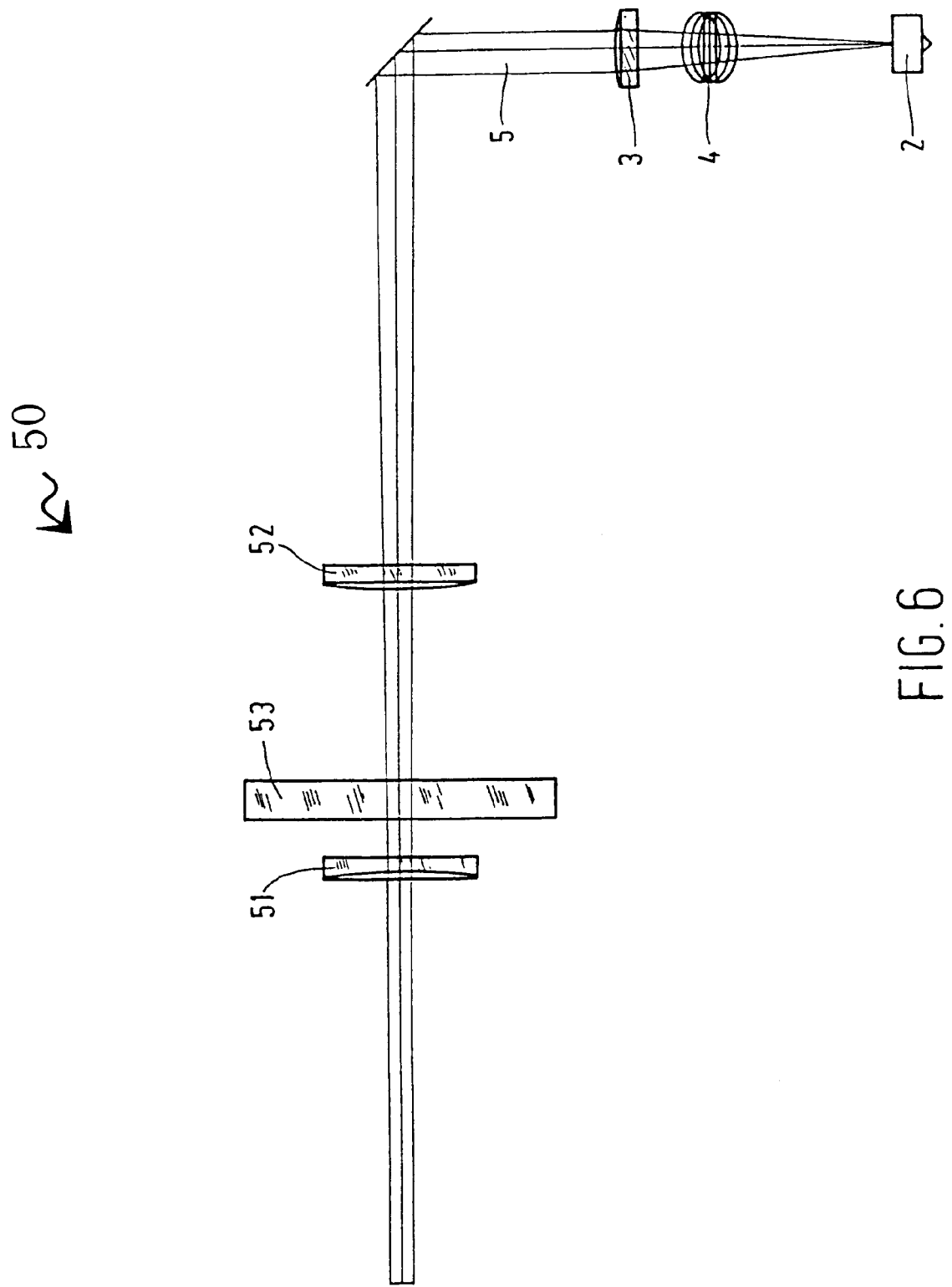

FIGS. 4, 5 and 6 show other embodiments of the device 20 according to the invention as shown in FIG. 2. In the device 30 that is shown in FIG. 4, a correction glass 31 is disposed between the correction lens 3 and the plan-parallel plate 4. Due to the presence of plan-parallel plate 4, which is disposed at an angle with respect to light beam 5, an astigmatism is introduced, which results in the focus of light beam 5 being located at a different point in the plane of the drawing of FIG. 4 than in a direction transversely thereto. This astigmatism is eliminated by means of correction glass 31.

For the same reason a device 41, which comprises two lenses 42, 43 that form a telescope and a prism 44 disposed therebetween, is disposed in the path of the light beam 5 in the device 40 which is shown in FIG. 5.

It is also possible to use the device 50 that is shown in FIG. 6 to eliminate the astigmatism introduced by plan-parallel plate 4, which device 50 comprises two parallel lenses 51, 52 and a cylindrical lens 53 disposed therebetween.

The first light source may for example be a red laser having a wavelength of 650 nm, whilst the second light source may be a laser having a wavelength of 257 nm.

In the device that is shown in FIG. 2, the correction lens is disposed between the focussing light source and the objective. It is also possible, however, to dispose correction lens 3 between the writing light source and the objective 2.

In the device that is shown in FIG. 2 the correction lens is rigidly connected to objective 2 by means of a bracket. It is also possible, however, to fit objective 2 and correction lens 3 with separate operating mechanisms, wherein the operating mechanisms are so controlled that the objective 2 and the correction lens are moved the same distance.

What is claimed is:

1. A device suitable for manufacturing an optical registration carrier, the device comprises:
   a support for said optical registration carrier,
   at least a first source emitting light having a wavelength and a second light source emitting light having a wavelength, the wavelengths of the light from said first source and said second light source are different from each other,
   an objective disposed between said light sources and said support, and is movable with respect to said light sources, and
   a correction lens is disposed between the first light source and the objective,
   wherein the correction lens is not disposed between the second light source and the objective, and the correction lens is moveable jointly with the objective, such that the focal points of the two light sources at least substantially coincide with various movements of the objective and the correction lens with respect to the light sources.

2. A device according to claim 1, wherein the first light source is aimed at the correction lens as a substantially parallel light beam, whilst the second light source is aimed at the objective as a substantially parallel light beam.

3. A device according to any one of the preceding claims, wherein said objective and said correction lens are mechanically interconnected.

4. A device according to claim 1 or 2, wherein said objective and said correction lens are each individually movable over equal distances.

5. A device according to claim 1, wherein an additional plate is disposed between the correction lens and the objective, through which plate the light beam from the first light source passes, whilst the light beam from the second light source is deflected in the direction of the objective.

6. A device according to claim 5, wherein said additional plate includes an angle with the light beam from the first light source.

7. A device according to claim 5 or 6, further comprises an astigmatic correction element is disposed between said additional plate and said first light source, wherein the astigmatisms introduced by said additional plate and said correction element substantially neutralize each other.

8. A device according to claim 7, wherein said astigmatic correction element comprises a correction plate which is disposed at an angle with respect to said additional plate.

9. A device according to claim 7, wherein said correction element includes an astigmatic cylindrical lens.

10. A device according to claim 7, wherein said correction element comprises a prism.

11. A device according to claim 1, wherein at least one of said light sources is a laser.

12. A device according to claim 11, wherein the wavelength of said laser is less than 400 nm.

13. A device according to claim 1, wherein the first light source does not write to the optical registration carrier, and the second light source writes to the optical registration carrier.

14. A device suitable for focussing a second light source by a first light source, the first light source emitting a light beam having a wavelength and the second light source emitting a light beam having a wavelength, the wavelength of the light beam from said first light source is different from that of the light beam from said second light source, and a common objective is disposed in front of said light sources, which objective is movable with respect to said light sources, the device comprises:
   a correction lens is disposed between the first light source and the objective, the correction lens is not disposed between the second light source and the objective, and
   a bracket support device configured and arranged to jointly support the correction lens and the objective,
   wherein the correction lens is jointly moveable with the objective, such that the focal points of the two light sources will at least substantially coincide with various movements of the objective and the correction lens with respect to the light sources.

* * * * *